May 6, 1924.
J. C. JEFFRIES
REEL
Filed July 14, 1922
1,493,115
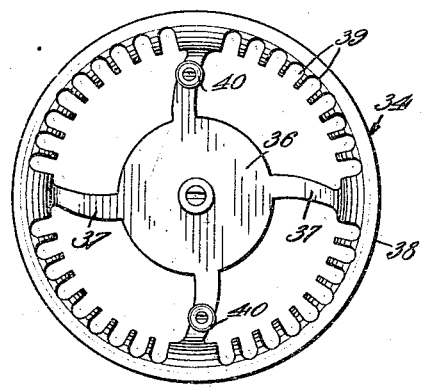
Fig. 1.
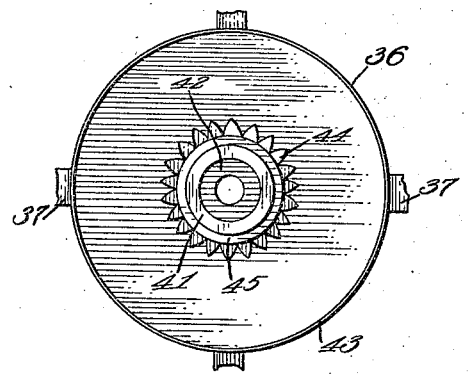
Fig. 3.
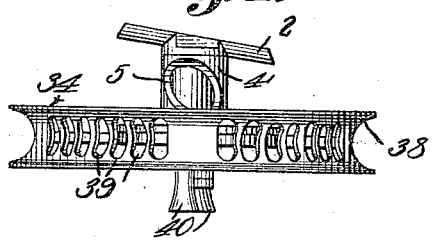
Fig. 2.
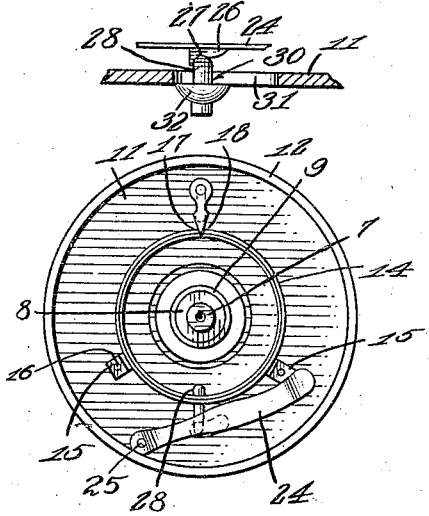
Fig. 4.
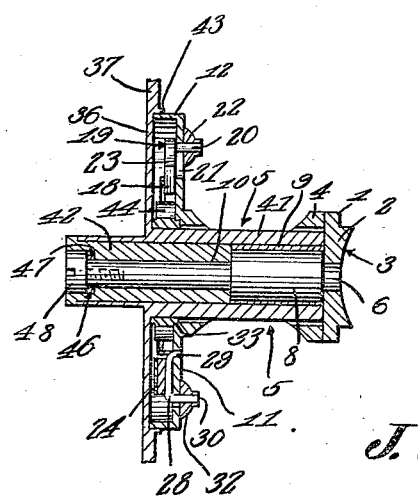
Fig. 5.
Fig. 6.
J. C. Jeffries  Inventor Patented May 6, 1924.

1,493,115

UNITED STATES PATENT OFFICE.

JOHN C. JEFFRIES, OF ANGOLA, INDIANA, ASSIGNOR OF ONE-HALF TO JOHN W. ORNDORF, OF CHURUBUSCO, INDIANA.

REEL.

Application filed July 14, 1922. Serial No. 574,959.

*To all whom it may concern:*

Be it known that I, JOHN C. JEFFRIES, a citizen of the United States, residing at Angola, in the county of Steuben and State of Indiana, have invented a new and useful Reel, of which the following is a specification.

The device forming the subject matter of this application is a fishing line reel, and one object of the invention is to provide a reel, all parts of which are readily accessible to the operator, when the reel is attached to a fish pole and whilst the fish pole is held in the hand. Another object of the invention is to provide a device of the kind above mentioned in which the rotatable member will turn readily and freely, without the use of ball bearings. A further object of the invention is to provide means whereby at the will of an operator, the rotation of the member which carries the line may be impeded more or less.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention; Figure 2 is a top plan; Figure 3 is an elevation showing the front plate and parts carried thereby; Figure 4 is a fragmental section showing a portion of the brake mechanism; Figure 5 is a transverse section wherein parts are broken away; Figure 6 is an elevation disclosing the shell and parts associated therewith.

In carrying out the invention, there is provided a support, denoted generally by the numeral 1, the support including a foot 2 which is concaved as indicated at 3 so as to cooperate, in the usual way, with a fishing rod. A tubular casing 4 projects from the foot 2 and has oppositely disposed openings 5. A shaft 7 is located in the casing 4, the inner end 6 of the shaft being mounted in the foot 2. The shaft 7 comprises a body 8, disposed adjacent to the foot 2, and reduced ends 10 projecting from the body 8, the body 8 carrying a tubular bushing 9 which, preferably is made from anti-friction material. The tubular casing 4 carries a disk-like shell 11 having a laterally extended marginal flange 12, there being an annular recess 33 in the outer end of the casing 4, at the place of juncture between the shell 11 and the casing 4.

An annular spring 14 is carried by the shell 11 and is connected thereto by spaced brackets 15 on the spring, the brackets being united by securing elements 16 with the shell 11. The spring 14 is divided, as shown at 17, to form free ends, between which extends the pointed head 18 of a pawl 19 carried by a pin 20 mounted for reciprocation in a slot 21 formed in the shell 11 the pin carrying a button 22 which is slidable on the outer surface of the shell 11. The pawl 19 has oppositely disposed seats 23.

A spring brake 24 in the form of a strip, is secured at one end, as at 25, to the inner surface of the shell 11, and carries a cam 26 provided with a seat 27. An arm 28 is pivotally mounted at 29 in the shell 11 to swing parallel to the shell, the arm comprising an angularly disposed finger 30 movable in a slot 31 formed in the shell 11, the finger carrying a button 32 slidable on the outer surface of the shell 11.

The reel embodies a rotatable member, denoted generally by the numeral 34 and including a front plate 36 having arms 37 carrying a circumferentially grooved rim 38 provided with transverse openings 39 in its tread, certain of the arms 37 being supplied with handles 40. The front plate 36 of the rotatable member 34 carries a tubular bearing 41 extended on both sides of the front plate 36. A tubular bushing 42, preferably made of anti-friction material, is secured in the outer end of the tubular bearing 41. The front plate 36 of the rotatable member 34 is supplied at its margin with a rearwardly projecting annular rib 43. The numeral 44 marks a ratchet wheel having a hub 45 surrounding and secured to the bearing 41 and abutting against the frame plate 36. A recess 46 is fashioned in the outer end of the bushing 42, and a washer 47, preferably made of anti-friction metal is seated and held in the recess 46.

The rear end of the tubular bearing 41 of the rotatable member 34 is received in the tubular casing 4 and fits about the anti-friction bushing 9 on the part 8 of the shaft 7, the bushing 42 receiving the reduced end 10 of the shaft 7. The marginal flange 12 of the shell 11 is received for rotation within the annular rib 43 of the front plate 36. The pawl 19 cooperates with the ratchet wheel 44. The hub 45 of the ratchet wheel 44 is received for rotation in the recess 33 of the casing 4. A securing element 48 is threaded or mounted otherwise in the outer extremity of the part 10 of the shaft 7 and is received in the recess 46, the head of the securing element 48 cooperating with the antifriction washer 47 and serving to hold the rotatable member 34 on the shaft 7.

In practical operation, the arm 28 is swung on its pivotal mounting 29 through the instrumentality of the button 32, the arm riding along the cam 26, on the brake 24 and arriving in the seat 27, the brake 24 being pressed against the front plate 36, and the rotation of the member 34 thus being controlled frictionally. The button 22 may be slid inwardly, carrying with it the pawl 19, the pointed head 18 of the pawl being advanced into engagement with the ratchet wheel 44 on the rotatable member 34, the spring arms defined by the opening 17 in the resilient member 14 being received in the seats 23 of the pawl 19, the pawl thus being held advanced, and in engagement with the ratchet wheel 44, the pawl being held, also for swinging movement, so that a click connection between the rotatable member 34 and the support 1 is afforded. The operator may place a thumb or finger in either of the openings 5 in the casing 4, to exert a pressure on the tubular bearing 41, thereby to limit the rotation of the member 34, it being observed that, as shown in Figure 2, the longer dimension of the opening 5 is disposed at an acute angle to the axis of the casing 4, this construction facilitating the insertion of the thumb or finger of the operator into the opening 4.

The device is so constructed that the rotatable member 34 will rotate freely and this result is brought about without the use of rolling elements, such as balls or the like. The operator may at any time provide a click brake by operating the pawl 19 to cause the same to cooperate with the ratchet wheel 44. By proper manipulation of the part 24, the friction brake on the rotatable member 34 may be afforded.

What is claimed is:—

1. In a fishing reel, a support; a shaft carried by the support and including a body and a reduced end; an anti-friction bushing surrounding and fixed to the body of the shaft; a rotatable member comprising a tubular bearing journaled on the bushing; an anti-friction bushing fixed in the tubular bearing and receiving the reduced end of the shaft; and means for holding the rotatable member on the shaft for rotation thereon.

2. In a fishing reel, a support; a tubular casing carried by the support; a shell mounted on the casing; a shaft carried by the support and including a body and a reduced end; an anti-friction bushing surrounding and fixed to the body of the shaft; a rotatable member comprising a tubular bearing journaled on the bushing; a front plate carried by the bearing and cooperating with the shell; an anti-friction bushing fixed in the tubular bearing and receiving the reduced end of the shaft; and means for holding the rotatable member on the shaft for rotation.

3. In a fishing reel, a rotatable member comprising a front plate; a shell; means for mounting the rotatable member on the shell for turning movement; a spring brake carried by the shell and adapted to engage the front plate, the brake being provided with a cam having a seat; and an arm mounted to swing on the shell, the arm cooperating with the cam to move the brake into operative relation to the front plate and cooperating with the seat to hold the brake in operative relation to the front plate.

4. In a device of the class described, a rotatable member including a shaft; and a support including a tubular casing wherein the shaft of the rotatable member is journaled, the casing having an opening permitting a portion of the hand of the operator to be brought into engagement with the shaft of the rotatable member, thereby to exert a braking effect on the rotatable member by way of the shaft.

In testimony that I claim the foregoing as my own, I have hereto affixed my signature in the presence of two witnesses.

JOHN C. JEFFRIES.

Witnesses:
  IDA M. KICHLER,
  GEORGE W. KICHLER.